United States Patent [19]
Johnson

[11] 3,806,153
[45] Apr. 23, 1974

[54] SAFETY BAG INFLATION FOR VEHICLES
[75] Inventor: James T. Johnson, Herrin, Ill.
[73] Assignee: Olin Corporation, New Haven, Conn.
[22] Filed: Feb. 7, 1972
[21] Appl. No.: 224,148

[52] U.S. Cl. .............. 280/150 AB, 137/68, 222/5
[51] Int. Cl. ............................................ B60r 21/06
[58] Field of Search ......... 280/150 AB; 137/68, 70; 222/5

[56] References Cited
UNITED STATES PATENTS

| | | |
|---|---|---|
| 3,674,059 | 7/1972 | Stephenson .............. 280/150 AB X |
| 3,197,234 | 7/1965 | Bertrand ........................ 280/150 AB |
| 2,515,068 | 7/1950 | Young .............................. 137/68 X |
| 3,567,245 | 3/1971 | Ekstrom ....................... 280/150 AB |
| 3,602,527 | 8/1971 | Goetz et al. .................. 280/150 AB |
| 3,632,135 | 1/1972 | Chute et al. .................. 280/150 AB |
| 3,638,964 | 2/1972 | Chute ........................... 280/150 AB |
| 2,947,315 | 8/1960 | Connell ............................. 137/68 |
| 2,972,998 | 2/1961 | Detwiler ........................... 137/68 |

Primary Examiner—Robert G. Sheridan
Assistant Examiner—Leslie J. Paperner
Attorney, Agent, or Firm—Donald R. Motsko; H. Samuel Kieser; William W. Jones

[57] ABSTRACT

An apparatus for use in vehicle safety systems which utilize an inflatable member, a stored fluid under pressure, and a propellant charge for generating a hot gas. The apparatus includes a sealed reservoir for storing the fluid under pressure and includes a wall portion operative to rupture at a predetermined pressure. A propellant storage means is provided adjacent the rupturable wall portion and has a propellant chamber therein which is located a propellant charge. The propellant charge generates hot gas and developes a predetermined pressure when ignited to cause the rupturing of the wall portion. The propellant storage means provides communication between the propellant chamber and interior of the reservoir. Outlet means is provided which is sealed by the wall portion and operative to provide an exit from said reservoir when the wall portion is ruptured.

10 Claims, 4 Drawing Figures

SAFETY BAG INFLATION FOR VEHICLES

This invention relates generally to the field of inflatable safety systems, and more particularly to an improved device for inflating the safety bag or confinement of such systems.

Inflatable safety systems of the type using an inflatable bag or confinement to protect the occupant of a vehicle from injury in case of a collision is known in the prior art. One type of system utilizes gas stored under high pressure which is released upon collision to inflate the confinement. This type of system requires the storage of fluid under high pressure in some type of reservoir and the use of a detonator to rupture a portion of the reservoir to release the stored fluid. Such systems tend to be bulky causing problems in fitting them into the limited space available. Leakage in such systems is also a problem due to the relatively high storage pressures required. Obviously, leakage in safety systems of this type cannot be tolerated since the system must be viable for the life cycle of the vehicle which is a substantial period of time.

In order to reduce the size of the container and to reduce the pressure and amount of fluid required to be stored, a system has been developed which uses the gas generated by a propellant charge to augment the fluid in inflating the confinement. The inflating device of the present invention is of this type.

It is an object of the present invention to provide an improved inflating device of the type used in connection with inflatable confinement vehicle safety systems.

A more specific object of the present invention is to provide an improved inflating device of the type where the volume of the fluid storage reservoir is less than the volume which would be needed to inflate an inflatable confinement without the addition of heat and gas from the propellant charge.

A further object of the present invention is the provision of a compact inflating device wherein the fluid reservoir is constructed to minimize the possibility of leakage.

Yet, another object of the present invention is the provision of an inflating device for safety vehicles wherein the fluid reservoir is provided with a closed propellant gas entrance port and a closed fluid outlet port formed integrally in the reservoir without the need for breaking the wall of the reservoir.

Still another object of the present invention is the provision of an inflating device wherein the reservoir is provided with a port which when opened permits a propellant gas to enter the reservoir and the stored fluid and gas to exit through the same port.

These and other objects and advantages of the present invention may be realized in accordance with the preferred embodiment through the provision of an inflating device which includes a fluid reservoir for storing a fluid under pressure which has a propellant storage chamber connected thereto. A propellant charge upon ignition causes communication to be provided between the chamber and the interior of the reservoir and also causes the opening of the fluid exit. The port in the reservoir through which the propellant gas enter the reservoir also serves as the exit port for the stored fluid and the propellant gas.

A better understanding of the present invention will be gained by reference to the following description of a preferred embodiment and to the accompanying drawing in which.

Figure 1:
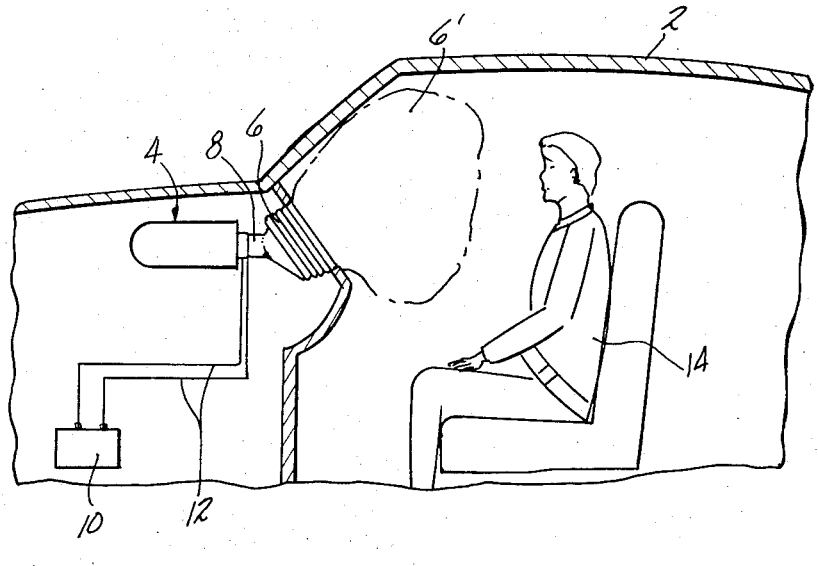
FIG. 1 is a fragmentary side view of a safety system incorporating the present invention, showing one arrangement of such system in a vehicle.
Figure 2:
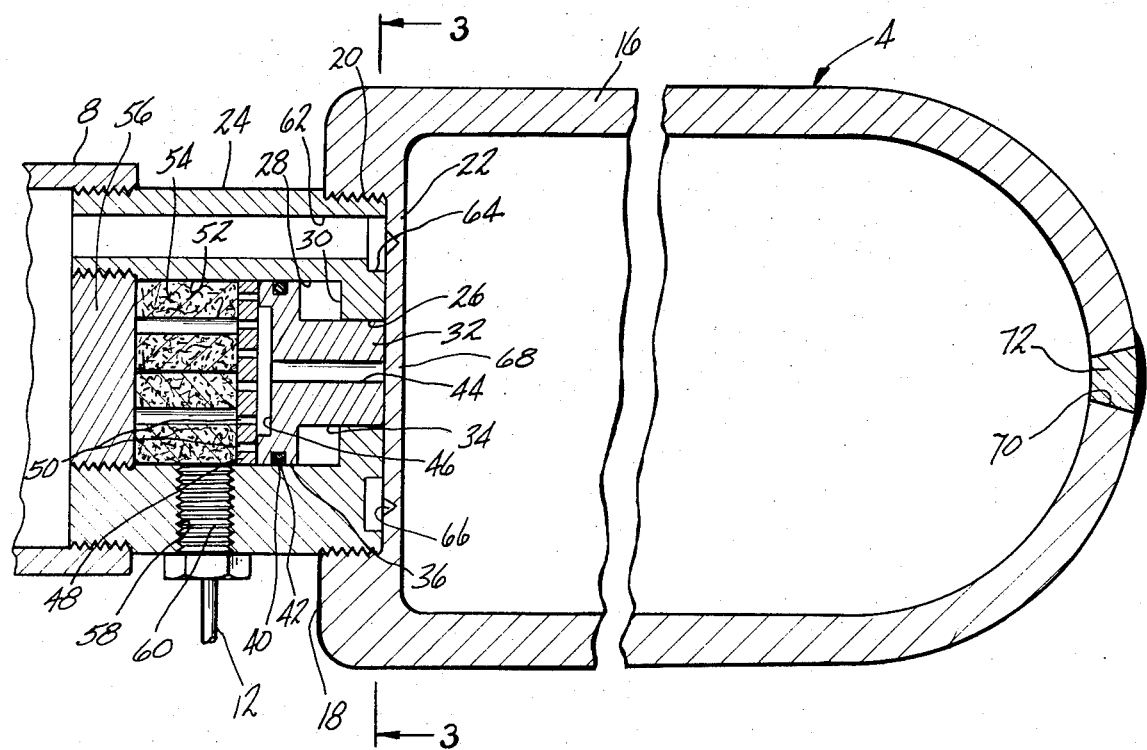
FIG. 2 is a sectional elevational view of the inflating unit of the system of FIG. 1.
Figure 3:
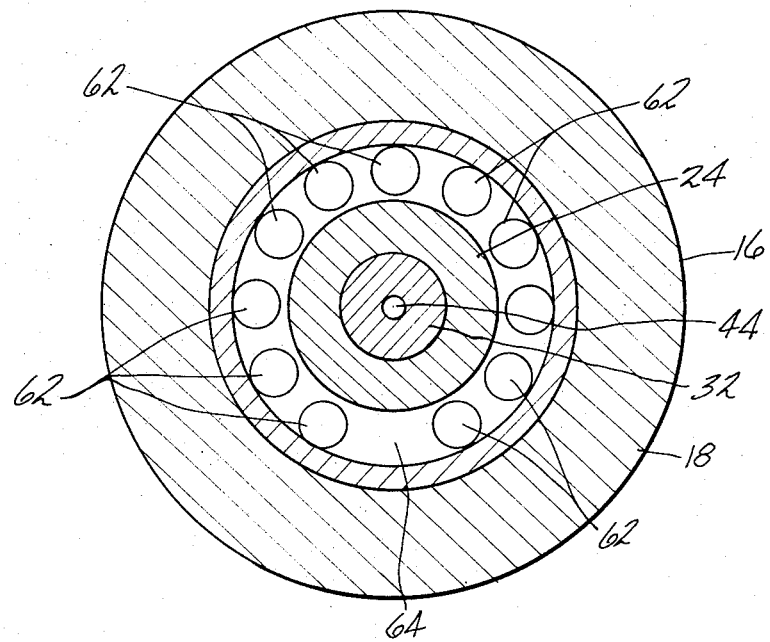
FIG. 3 is a transverse sectional view taken along the lines 3—3 of FIG. 2.
Figure 4:
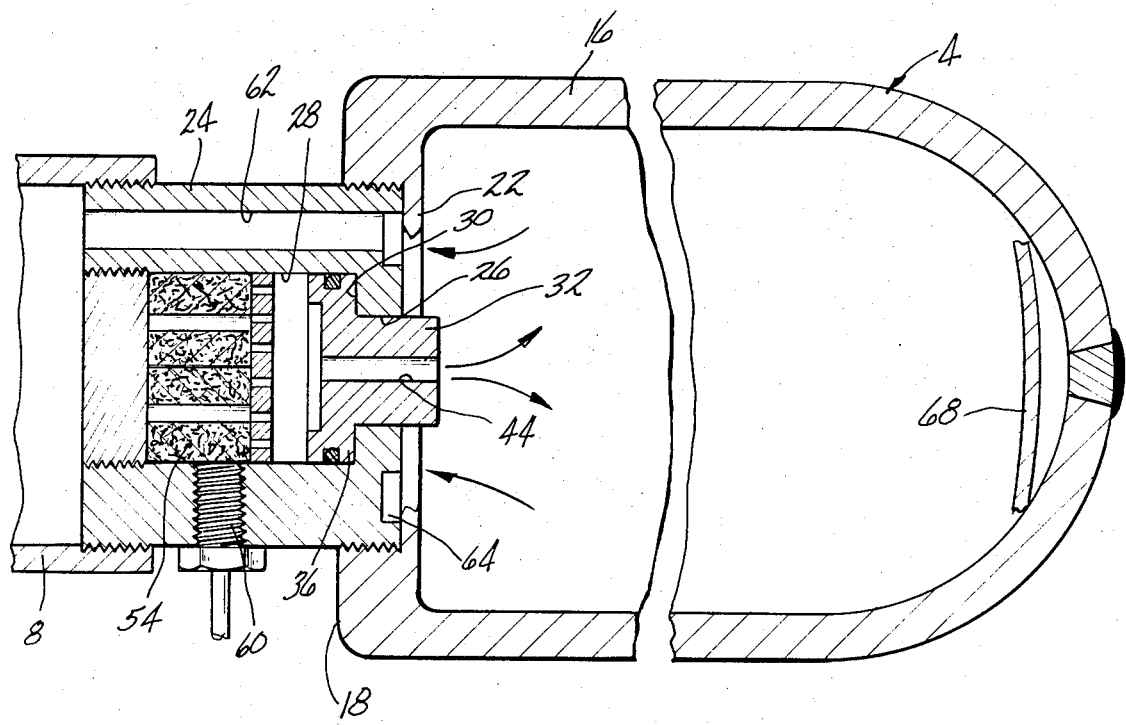
FIG. 4 is a fragmentary side view similar to FIG. 2 but showing the position of the components of the inflator after the propellant charge has been ignited and the exit port uncovered.

Referring to the drawings and in particular FIG. 1, a safety system incorporating the present invention is shown mounted in vehicle 2. The system includes an inflating unit 4 connected to an inflatable confinement 6 by means of a manifold 8. By way of example, the confinement 6 is shown as being mounted in the dash board of the vehicle 2 in its collapsed or stored position.

It should be understood, however, that the confinement 6 may be mounted in other locations in the vehicle if desired, such as the steering wheel, roof, seat-back, or the like. The confinement 6 may be in the form of a flexible bag of rubber, cloth, or other suitable material and may be vented in any known manner, or non-vented as desired.

A collision sensor 10 is attached to the vehicle 2 and is connected to the inflating unit by suitable electrical connectors 12. The sensor 10 may be of any suitable type which will produce an electrical current when the vehicle 2 is involved in a collision of a predetermined magnitude. The electrical current serves to actuate the inflating unit 4 which in turn inflates the confinement 6 into its expanded condition as indicated at 6' to provide a cushion against which the occupant 14 of the vehicle 2 will impact.

The inflating unit 4, in accordance with the present invention, comprises a pressure reservoir 16 for storing a suitable fluid under pressure. The reservoir 16 may be elongated in an axial direction and have a generally flat end wall 18. The end wall 18 is provided with an external bore 20 which forms a web 22 between the interior of the reservoir 16 and the exterior thereof.

The bore 20 of the reservoir 16 is threaded to receive a threaded propellant chamber housing 24. The propellant chamber housing 24 has a generally cylindrical configuration and includes a first bore 26 extending coaxial with the axis of the chamber 24 and also a coaxial counterbore 28 which forms a shoulder 30 in the bore.

A plunger-nozzle member 32 is mounted in the bore of the propellant chamber housing 24 and includes a reduced diameter portion 34 which extends through bore 26 into engagement with the web 22 of the reservoir 16. An enlarged head portion 36 on the end of the plunger-nozzle member 32 is guided in the counterbore 28. The enlarged head portion 36 includes a circumferentially extending groove 40 in its side wall in which is mounted a suitable sealing ring 42 such as an O-ring or the like. An orifice 44 extends through the plunger-nozzle member 32 with the end of the head portion 36 having an enlarged recess 46 therein which is in communication with the orifice 44.

A screen member 48 containing a number of perforations 50 is mounted within the counterbore 28 immediately behind plunger-nozzle member 32 in engagement with the head portion thereof. A propellant chamber 52, in which a suitable propellant charge 54 is placed, is formed within the counterbore 28 immediately behind the screen member 48 and is closed by a threadedly secured end cap 56. The propellant charge 54 may be of any suitable type capable of generating a non-toxic gas when ignited and mixed with the fluid in the reservoir 16. The propellant charge 54 may be in the form of loose powder, a solid gas-generating cartridge, or a plurality of large grains or pellets.

A threaded bore 58 extends through the side wall of the propellant chamber housing 24 and communicates with the propellant chamber 52. A suitable squib member 60 is secured within the bore 58 to provide ignition of the propellant charge 54 when subjected to an electrical current from the electrical connectors 12.

A series of circumferentially spaced outlet ports 62 extend through the propellant chamber housing and have an axis parallel to the axis of the bore 26. At the forward end of the housing 24, adjacent to the web 22, a circular groove 64 is provided which intersects the forward ends of the outlet ports 62 to form an outlet manifold.

The web 22 is provided with a circular groove 66 which is positioned directly opposite the groove or manifold 64 in the propellant chamber housing 24. The groove 66 defines a rupturable closure portion 68 which will rupture at a predetermined pressure and provide communication between the propellant chamber 52 and the interior of the reservoir 16, as well as between the outlet manifold 64 and the interior of the reservoir 16.

The reservoir 16 is initially provided with an opening 70 in its wall to provide means for introducing a suitable fluid into the reservoir 16 under suitable pressure. After the reservoir 16 is filled with fluid to the proper pressure, a plug member 72 may be inserted into the opening 70 and welded in place to provide a fluid-tight seal. The fluid may be air, oxygen, nytrogen, mixtures and of or other suitable non-toxic materials. The propellant chamber housing 24 is provided with threads 74 to provide means for attaching it to the manifold 8.

The operation of the inflating unit 4 of this invention when installed as a part of the system depict in FIG. 1 is as follows. When the vehicle 2 is involved in a collision of sufficient magnitude, the sensor 10 is activated and sends an electric current through the electrical connectors 12 to the squib member 60 which is thus caused to ignite. The ignition of the squib member 60 in turn ignites the propellant charge 54 and causes it to burn. The burning of the propellant charge 54 increases the pressure within the propellant chamber 52 and applies a force on the plunger-nozzle member 32 which in turn exerts a force on the rupturable closure portion 68 of the web 22. When the pressure of the plunger-nozzle member 32 on the closure portion 68 reaches the predetermined magnitude, the closure portion 68 breaks loose from the web 22 at the groove 64 and passes into the interior of the reservoir 16.

Upon rupture of the closure portion 68, the plunger-nozzle member 32 moves forwardly toward the interior of the fluid reservoir 16 until the enlarged head portion 36 abuts the shoulder 30 in the bore and is stopped from further movement. The screen 48 retains the propellant charge 54 while burning so that it will not block the orifice 44 in the plunger-nozzle member 32. The orifice 44 in the plunger-nozzle member 32 is so sized that it restricts the propellant gas flow so that proper pressure is maintained in the propellant chamber 52 to properly burn the propellant.

The gas generated by the burning of the propellant charge 54 passes through the nozzle orifice 44 into the interior of the reservoir and mixes with the fluid in the reservoir. The rupturing of the closure portion 68 by the plunger-nozzle member 32 also serves to open the circular groove 64 to the interior of the pressure reservoir 16 so that the fluid stored in the reservoir 16 and the gas generated by the burning of the propellant charge 54 will pass through the outlet 62 into the manifold 8 and causes inflation of the confinement 6.

By virtue of the above described arrangement, both the inlet from the propellant chamber 52 to the interior of the reservoir 16 and the outlet from the interior of the reservoir 16 are opened simultaneously so there is no build up of pressure in the pressure reservoir due to the burning of the propellant charge. Moreover, with the particular arrangement shown, the propellant chamber 52 can be attached externally to the interior of the reservoir 16 thus minimizing leakage of the stored fluid.

What is claimed is:

1. A pressure generator for inflating safety devices and the like comprising:
   a. a sealed reservoir for storing a fluid under pressure and including a wall portion operative to rupture at a predetermined pressure;
   b. propellant storage chamber means adjacent said wall portion having a propellant storage chamber therein for storing a propellant charge, said propellant storage chamber means providing communication between said propellant storage chamber and the interior of said reservoir when said wall portion is ruptured;
   c. propellant charge means in said propellant storage chamber for generating a hot gas and developing a predetermined pressure when ignited to cause the rupturing of said wall means; and
   d. outlet means sealed by said wall portion and operative to provide an exit from said reservoir for said stored fluid and hot gas when said wall portion is ruptured.

2. The pressure generator of claim 1 wherein said propellant storage means includes a plunger member positioned between said propellant storage chamber and said wall portion for activation by the gas from the propellant charge upon the ignition thereof to rupture said wall portion.

3. The pressure generator of claim 2 wherein said plunger member has a nozzle orifice therethrough to permit the hot gas from the propellant chamber to flow to the interior of said reservoir after said wall portion is ruptured.

4. The pressure generator of claim 3 wherein means are provided for preventing said plunger member from passing into the interior of said reservoir upon the rupturing of said wall portion.

5. An apparatus for use in a vehicle safety system utilizing an inflatable member, a stored fluid under pressure, and a propellant charge for the generation of a hot gas, said apparatus including:
   a. a sealed reservoir for storing a fluid under pressure and having a rupturable wall portion operative to rupture at a given pressure;

b. housing means attached to said reservoir adjacent said rupturable wall portion;
c. a propellant chamber in said housing means for storing a propellant charge and having communication with the interior of said reservoir when said wall portion is rupturable;
d. a propellant charge in said propellant chamber for producing a hot gas and developing a predetermined pressure upon ignition to cause the rupture of said rupturable wall portion;
e. outlet means in said housing sealed by said rupturable wall portion from the interior of said reservoir and operative to provide an exit from said reservoir for said stored fluid and hot gas when said rupturable wall portion is ruptured.

6. The apparatus of claim 5 further including a plunger member mounted in said housing means between said propellant chamber and said rupturable wall portion for activating by the gas from the propellant charge upon the ignition thereof to rupture said rupturable wall portion.

7. The apparatus of claim 6 wherein said plunger member has a nozzle orifice therethrough to provide communication between the propellant chamber and the interior of the reservoir after the wall portion is ruptured.

8. The apparatus of claim 7 wherein means are provided for preventing said plunger member from passing into the interior of said reservoir upon rupturing of said wall portion.

9. The apparatus of claim 5 wherein said reservoir has an external bore therein said rupturable wall portion formed at the bottom of said bore, said housing means being mounted in said bore, said outlet means comprising a plurality of ports through said housing means extending generally parallel to the axis of the bore, each bore having one end positioned adjacent said rupturable wall portion, a groove in the housing means adjacent said rupturable wall portion interconnecting said ends of said ports.

10. The apparatus of claim 9 wherein said housing means has a bore therethrough, one end of said housing means bore being positioned adjacent said wall portion, said propellant chamber being formed in said housing means bore, a reduced portion in said bore forming a shoulder positioned intermediate the propellant chamber and said one end of said housing means bore, a plunger member positioned between said propellant chamber and said rupturable wall portion, said nozzle member including an enlarged head portion slidably engaging the bore between the propellant chamber and said shoulder and a reduced extension portion engaging the reduced portion of said bore, and said plunger member having a nozzle orifice therein to provide communication between the propellant chamber and the interior of said reservoir when said wall portion is ruptured.

* * * * *